US012081731B2

(12) United States Patent
Takenoshita et al.

(10) Patent No.: US 12,081,731 B2
(45) Date of Patent: Sep. 3, 2024

(54) VIDEO SIGNAL PROCESSING DEVICE

(71) Applicant: LAPIS Technology Co., Ltd., Yokohama (JP)

(72) Inventors: Tadashi Takenoshita, Yokohama (JP); Masataka Oguchi, Yokohama (JP); Takuya Motohashi, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 28 days.

(21) Appl. No.: 18/186,599

(22) Filed: Mar. 20, 2023

(65) Prior Publication Data

US 2023/0328223 A1    Oct. 12, 2023

(30) Foreign Application Priority Data

Mar. 28, 2022 (JP) ................................. 2022-051531

(51) Int. Cl.
*H04N 17/00* (2006.01)
*G06F 11/07* (2006.01)
*G06F 11/08* (2006.01)
*H04N 5/14* (2006.01)

(52) U.S. Cl.
CPC ............. *H04N 17/00* (2013.01); *G06F 11/08* (2013.01); *H04N 5/147* (2013.01)

(58) Field of Classification Search
CPC ...... H04N 17/00; H04N 5/147; H04N 5/2627; G06F 11/08; G06F 11/0751; G06F 11/0766; G09G 3/06; G09G 2320/029; G09G 2380/11

See application file for complete search history.

(56) References Cited

U.S. PATENT DOCUMENTS

| 6,173,422 B1 * | 1/2001 | Kimura | H04H 60/95 348/E17.001 |
| 6,633,329 B2 * | 10/2003 | Janko | H04N 17/00 348/180 |
| 8,564,669 B2 * | 10/2013 | Seigneurbieux | H04N 19/85 348/180 |
| 10,277,805 B2 * | 4/2019 | Emi | G08B 25/00 |
| 10,319,271 B2 * | 6/2019 | Dunn | G09G 3/20 |
| 10,611,305 B2 * | 4/2020 | Mano | H04N 17/002 |

(Continued)

FOREIGN PATENT DOCUMENTS

JP 2020-123950 A 8/2020

*Primary Examiner* — Brian P Yenke
(74) *Attorney, Agent, or Firm* — Rabin & Berdo, P.C.

(57) ABSTRACT

A video signal processing device includes a selection/output unit that receives a video signal, sequentially selects and outputs a sequence of image data pieces of split image regions, a CRC calculation circuit that executes CRC calculation on a sequence of pixel data pieces outputted from the selection/output unit, a calculation result sorting unit that generates test values corresponding to the split image regions based on a CRC calculation result, a freeze determination unit that, based on the test values corresponding to one frame and the test values corresponding to another frame, determines whether a change has occurred in the video of the split image regions between the frames, and a video freeze detection unit that, by determining whether or not a state where no change has occurred in the video is continuing over a prescribed number of frame periods, detects whether or not the video is frozen.

6 Claims, 5 Drawing Sheets

(56) References Cited

U.S. PATENT DOCUMENTS

| | | | | |
|---|---|---|---|---|
| 11,012,637 B2 * | 5/2021 | Al Ani | ............ | H04N 17/04 |
| 11,284,062 B2 * | 3/2022 | Dubey | ............ | H04N 7/183 |
| 11,429,470 B2 * | 8/2022 | Fujii | ............ | G06F 11/0763 |
| 11,462,192 B2 * | 10/2022 | Gerdes | ............ | G09G 3/006 |
| 11,611,686 B2 * | 3/2023 | Ichikawa | ............ | H04N 7/183 |
| 11,652,953 B2 * | 5/2023 | Ichikawa | ............ | G06V 20/48 |
| | | | | 348/180 |
| 11,715,188 B1 * | 8/2023 | Mody | ............ | G06V 10/40 |
| | | | | 382/307 |
| 11,741,999 B2 * | 8/2023 | Imatoh | ............ | H04N 7/183 |
| | | | | 386/263 |
| 11,756,504 B2 * | 9/2023 | Obara | ............ | G09G 5/377 |
| | | | | 345/214 |
| 11,863,713 B2 * | 1/2024 | Nandan | ............ | H04N 7/183 |
| 11,876,955 B2 * | 1/2024 | Mindt | ............ | H04N 17/002 |
| 11,961,434 B2 * | 4/2024 | Jeong | ............ | G09G 5/003 |
| 2013/0120587 A1 * | 5/2013 | Gu | ............ | H04N 17/002 |
| | | | | 348/180 |
| 2015/0130952 A1 * | 5/2015 | Wang | ............ | H04N 19/44 |
| | | | | 348/192 |
| 2015/0256822 A1 * | 9/2015 | Gao | ............ | H04N 19/00 |
| | | | | 348/192 |
| 2016/0150228 A1 * | 5/2016 | Greene | ............ | H04N 5/50 |
| | | | | 348/192 |
| 2017/0213526 A1 * | 7/2017 | Hara | ............ | G09G 3/2096 |
| 2020/0193882 A1 * | 6/2020 | Tamano | ............ | G02F 1/13 |
| 2023/0073794 A1 * | 3/2023 | Akiba | ............ | G06F 11/162 |
| 2023/0237941 A1 * | 7/2023 | Jeong | ............ | G09G 3/006 |
| | | | | 345/204 |
| 2023/0281950 A1 * | 9/2023 | Niedermeyer | ............ | G09G 5/003 |
| | | | | 382/190 |
| 2024/0021116 A1 * | 1/2024 | Jeong | ............ | G09G 3/006 |
| 2024/0048683 A1 * | 2/2024 | Thodeti | ............ | H04N 17/002 |

* cited by examiner

VIDEO SIGNAL PROCESSING DEVICE

CROSS REFERENCE TO RELATED APPLICATION

This application is based upon and claims the benefit of priority of the prior Japanese Patent Application No. 2022-051531, filed on Mar. 28, 2022, the entire contents of which are incorporated herein by reference.

TECHNICAL FIELD

The present invention pertains to a video signal processing device that detects freezing of a video signal.

BACKGROUND ART

In recent years, in vehicle display systems and the like that display a video captured by a vehicle-mounted camera in a display, video signal processing devices provided with the function of detecting freezing of a video signal have been proposed (e.g., Japanese Patent Application Laid-Open Publication No. 2020-123950).

In such a video signal processing device, the video is determined to have frozen if the video data of the current frame captured by the camera is compared to the video data from one frame prior and both pieces of video data match each other. Typically, the volume of video data is large, and thus, one frame of video data is split into a plurality of data pieces, and the corresponding data pieces are compared to determine whether or not the video is frozen.

SUMMARY OF THE INVENTION

In a freeze detection circuit such as that of the conventional technique, CRC calculation is performed for each of the split data pieces and the calculation result for the current frame is compared to the calculation result for one frame prior, thereby determining whether or not the video is frozen. Thus, there was a need to provide a number of CRC calculation circuits corresponding to the number of split data pieces, which has presented the problem of increased circuit size.

The present invention takes into account the above-mentioned problem and an object thereof is to provide a video signal processing device that can detect freezing of a video while mitigating an increase in circuit size.

A video signal processing device according to the present invention includes: a selection/output unit that receives a video signal including a sequence of a plurality of pixel data pieces over a plurality of frames, and that sequentially selects and outputs sequences of image data pieces of first to kth split image regions (k being an integer of 2 or greater) that are respectively at same positions over the plurality of frames; a CRC calculation circuit that executes cyclic redundancy check (CRC) calculation on the sequence of pixel data pieces outputted from the selection/output unit; a calculation result sorting unit that generates first to kth test values corresponding, respectively, to the first to kth split image regions on the basis of a calculation result of the CRC calculation circuit; a freeze determination unit that, on the basis of the first to kth test values corresponding to one frame of the video signal and the first to kth test values corresponding to another frame, determines whether a change has occurred in the video of the first to kth split image regions between the frames, and generates first to kth freeze determination signals representing respective determination results; and a video freeze detection unit that, by determining whether or not a state where no change has occurred in the video is continuing over a prescribed number of frame periods on the basis of the first to kth freeze determination signals, detects whether or not the video based on the video signal is frozen.

According to the video signal processing device of the present invention, it is possible to detect freezing of a video while suppressing an increase in circuit size.

DETAILED DESCRIPTION OF EMBODIMENTS

Figure 1:
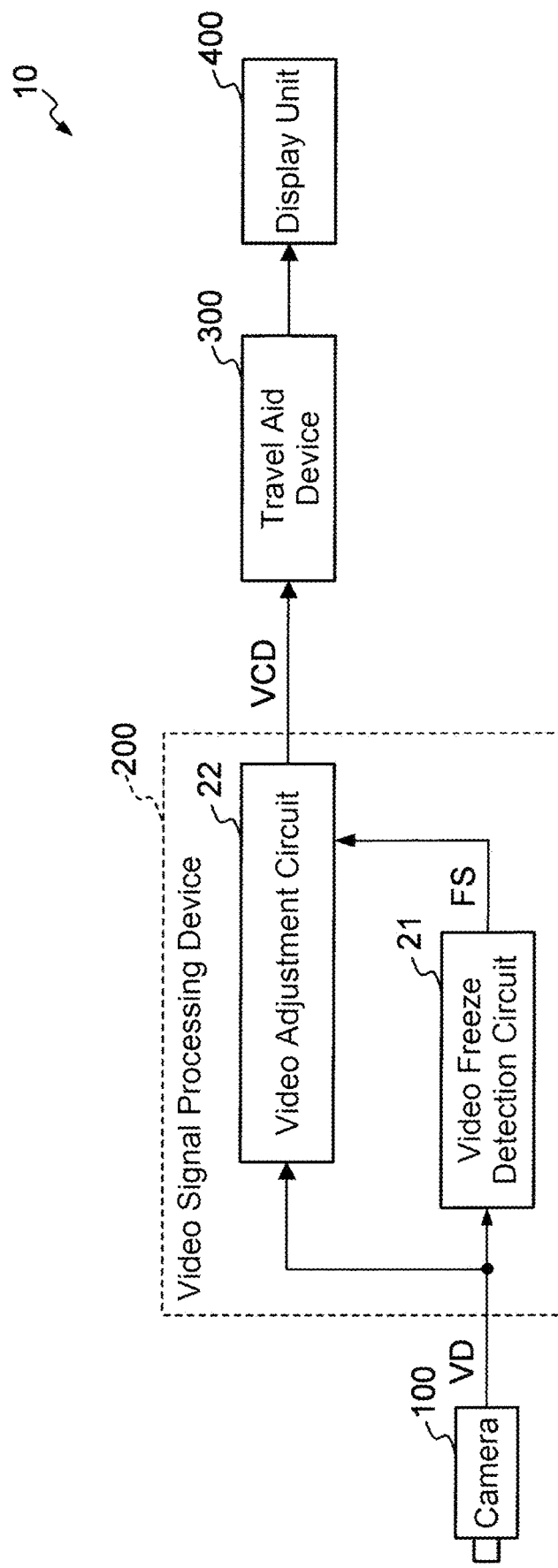
FIG. 1 is a block diagram showing a schematic configuration of a driving aid system that includes a video signal processing device according to the present invention.

Embodiments of the present invention will be explained below with reference to the drawings. In the description of embodiments and the affixed drawings below, parts that are substantially the same or equivalent are assigned the same reference characters.

Embodiment 1

FIG. 1 is a block diagram showing a schematic configuration of a driving aid system 10 that includes a video signal processing device according to the present invention. The driving aid system 10 has a camera 100, a video signal processing device 200, a travel aid device 300, and a display unit 400.

The camera 100 is installed in a vehicle, captures an area to the front of the vehicle, an area to the rear of the vehicle, and areas to the sides of the vehicle, generates a video signal including a pixel data sequence corresponding to respective pixels, and supplies the pixel data sequence to the video signal processing device 200 as a captured video signal VD.

The pixel data pieces for one pixel included in the captured video signal VD are constituted of 24-bit data that represents the luminance level for red, the luminance level for green, and the luminance level for blue in 8 bits each, for example. Thus, if the pixel count for one frame of the captured video signal VD is n (n being an integer of 2 or greater), then a captured video signal VD including n pixel data pieces constituted of 24-bit data is supplied to the video signal processing device 200 for each frame.

The video signal processing device 200 includes a video freeze detection circuit 21 and a video adjustment circuit 22. The video freeze detection circuit 21 detects the presence or absence of a so-called frozen state in which the video captured by the camera 100 has not changed, on the basis of the captured video signal VD, and supplies a freeze detection signal FS indicating this detection result to the video adjustment circuit 22. In other words, the video freeze detection circuit 21 supplies, to the video adjustment circuit 22, the freeze detection signal FS, which indicates "frozen" if the captured video is in a frozen state and "non-frozen" if the captured video is not in a frozen state.

Upon receiving a freeze detection signal FS indicating "non-frozen," the video adjustment circuit 22 supplies, as a captured video signal VCD to the travel aid device 300, a signal attained by performing adjustments on properties of the captured video signal VD such as the hue, luminance, and contrast. On the other hand, if a freeze detection signal FS indicating "frozen" is received, the video adjustment circuit 22 supplies, as a captured video signal VCD to the travel aid device 300, a video signal indicating the frozen state. For example, the video adjustment circuit 22 supplies, to the travel aid device 300, a captured video signal VCD indicating that the captured video is frozen using text or displaying a single color (such as blue) on the entire screen.

On the basis of the captured video signal VCD, the travel aid device 300 performs various types of travel aid control such as inter-vehicle control in which the host vehicle maintains a given distance from a vehicle to the front thereof, lane departure prevention control to prompt vehicular travel within the travel lane, proximity notification control for notifying that the host vehicle is in close proximity to another vehicle, and collision avoidance control. In doing so, the travel aid device 300 supplies, as a travel aid image signal to the display unit 400, a video displaying various warnings or instruction messages pertaining to the travel aid control. The travel aid device 300 may supply, as a monitor video signal to the display unit 400, a video signal in which a warning or instruction message is superimposed on a video based on the captured video signal VCD or the captured video signal VCD itself.

Additionally, the travel aid device 300 has a navigation function for navigating the host vehicle from the current location to a destination, and supplies, to the display unit 400, a map image signal showing a map image of the area surrounding the current location of the host vehicle.

The display unit 400 includes, aside from a main display that displays a video based on the map image signal and the travel aid image signal, a light-emitting indicator installed on a side mirror or a rearward monitor display that satisfies the function of the rear view mirror, for example. When the camera 100 captures the landscape to the rear of the vehicle, for example, the rearward monitor display displays a video based on the captured video signal VCD. If the video freeze detection circuit 21 detects that the video captured by the camera 100 is in a frozen state, the main display and the rearward monitor display indicate the frozen state by text or by displaying a single color on the entire screen.

Next, a detailed configuration of a video freeze detection circuit 21 will be described.

Figure 2:
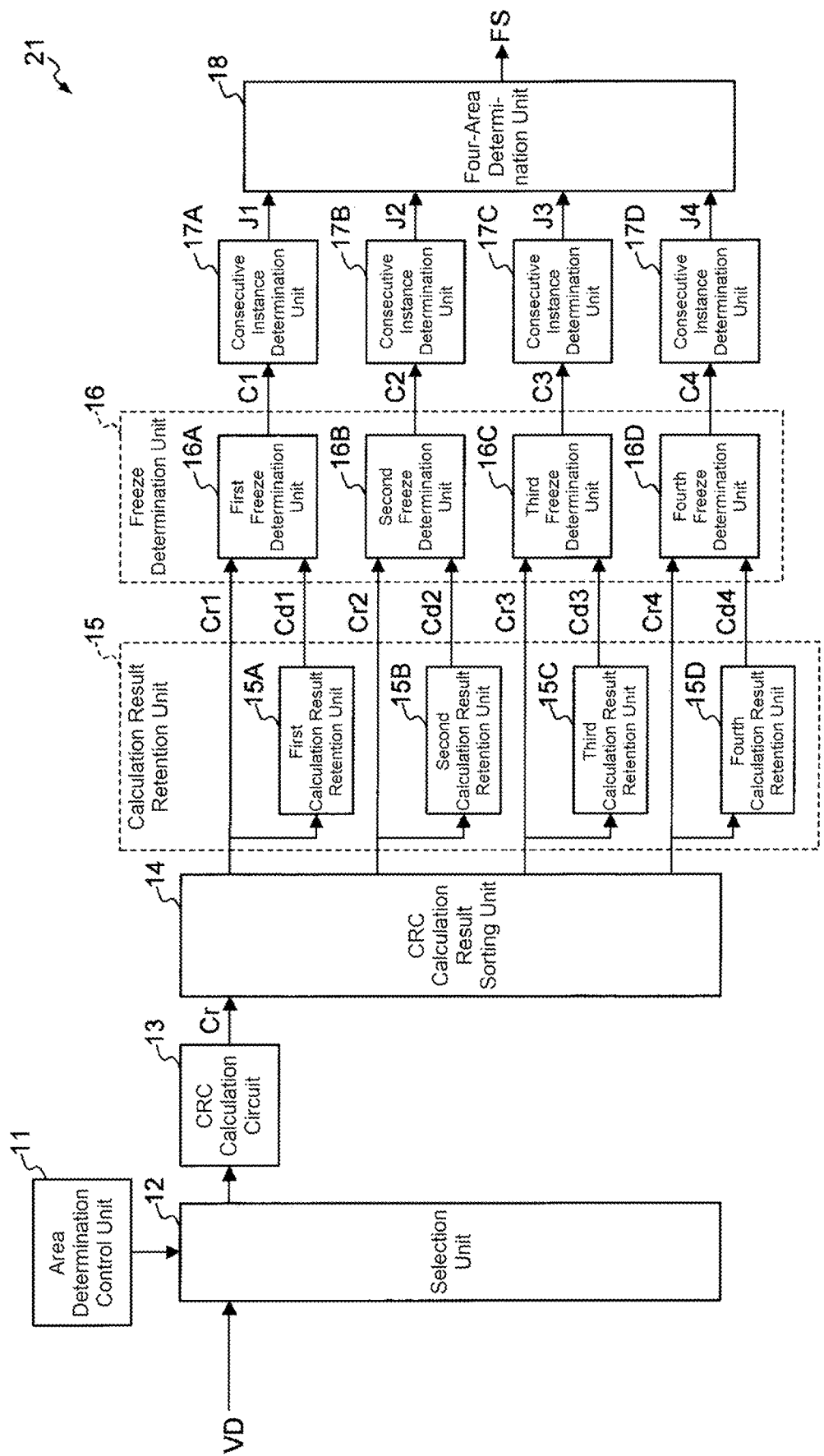
FIG. 2 is a block diagram showing an internal configuration of a video freeze detection circuit according to Embodiment 1.

FIG. 2 is a block diagram showing an example of an internal configuration of the video freeze detection circuit 21. The video freeze detection circuit 21 includes an area determination control unit 11, a selection unit 12, a CRC calculation circuit 13, a CRC calculation result sorting unit 14, a calculation result retention unit 15, a freeze determination unit 16, consecutive instance determination units 17A to 17D, and a four-area determination unit 18.

The area determination control unit 11 is a block that performs control for the selection unit 12 to select a video signal (i.e., a sequence of pixel data pieces) subject to CRC calculation from the captured video signal VD. In the present embodiment, four regions of the image region for each frame are set in advance as regions subject to video freeze detection, or in other words, regions subject to CRC calculation, in a register (not shown) provided in the area determination control unit 11. The four regions are split image regions that are located at the same position within a screen across a plurality of frames.

Figure 3:
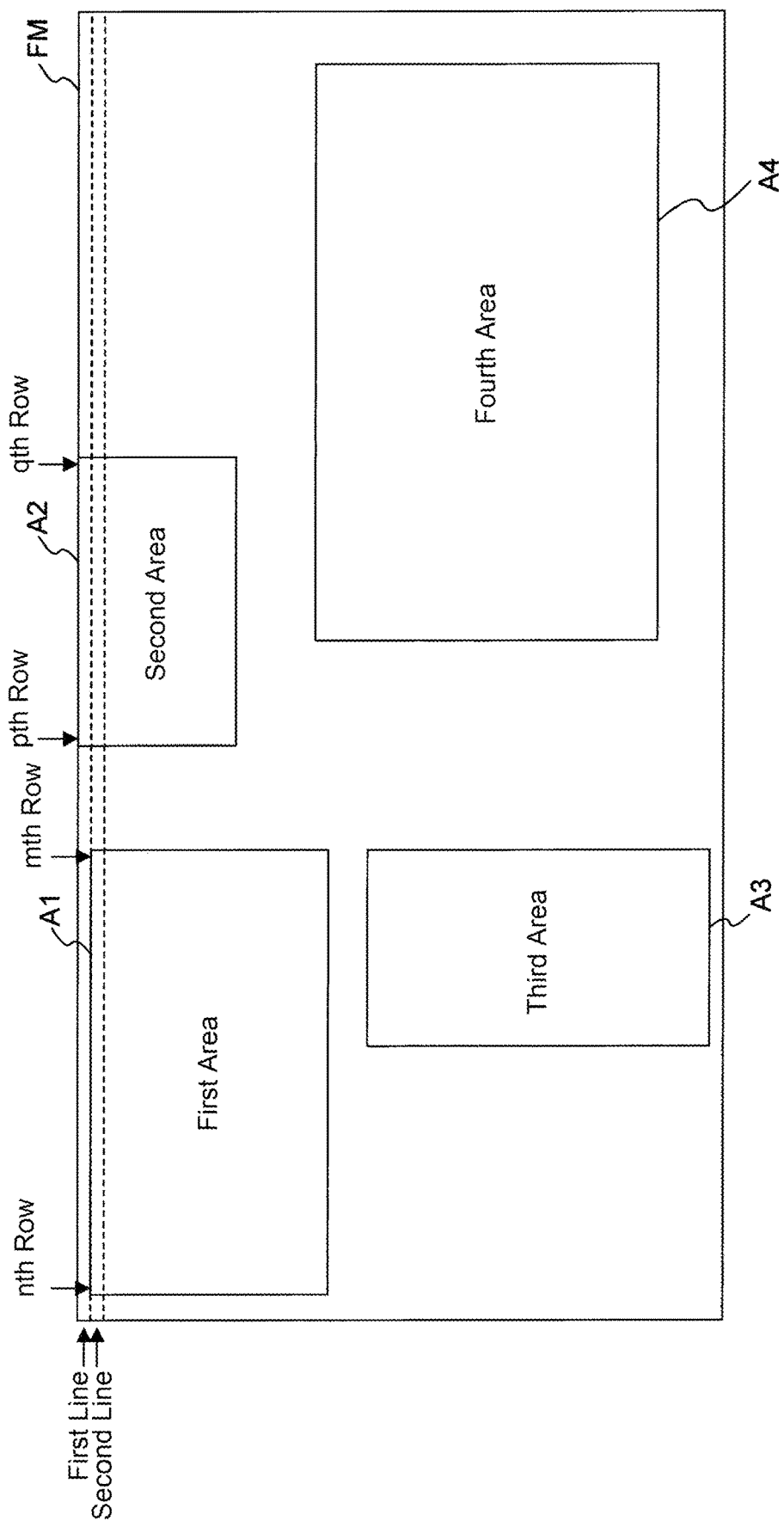
FIG. 3 is a drawing that shows the timings at which CRC calculation for each video data piece corresponding to each of a plurality of areas and a calculation result retention process are performed.

FIG. 3 is a drawing that shows an example of four image regions that are regions subject to video freeze detection (hereinafter referred to as freeze determination regions). Here, a case is shown in which a first area A1, a second area A2, a third area A3, and a fourth area A4 in an image FM of one frame are set, respectively, as freeze determination regions. As shown here, the freeze determination regions need not necessarily be continuous regions, and may be regions of different sizes.

The freeze determination regions are determined on the basis of the position and width in the vertical direction, and the position and width in the horizontal direction, for example. In the present embodiment, the video signal processing device 200 is installed in the driving aid system 10, and thus, image regions that include information useful for driving aid such as the display positions of instruments and warning lights are set as the freeze determination regions, for example.

The area determination control unit 11 sequentially determines whether each of the sequences of pixel data pieces included in the captured video signal VD correspond to freeze determination regions, and controls the selection operation by the selection unit 12 on the basis of the determination results.

Returning to FIG. 2, the selection unit 12 selects each line of pixel data piece sequences subject to CRC calculation for each pixel data piece according to determination and control of the freeze determination regions by the area determination control unit 11, and supplies each of the lines of pixel data piece sequences to the CRC calculation circuit 13. In the example shown in FIG. 3, the pth to qth rows of the sequence of pixel data pieces in the first line, or in other words, a region corresponding to the first line of the second area A2 is selected as the sequence of pixel data pieces to be subject to CRC calculation. In the second line, the nth to mth rows and the pth to qth rows, or in other words, regions corresponding to the first and second areas A1 and A2 are selected as the sequences of pixel data pieces to be subject to CRC calculation.

That is, the area determination control unit 11 and the selection unit 12 constitute a selection/output unit that sequentially select and output sequences of image data pieces of four split image regions at the same positions over the plurality of frames, from the captured video signal VD.

The CRC calculation circuit 13 executes a cyclic redundancy check (CRC) on the sequence of pixel data pieces for each line supplied from the selection unit 12. In other words, the CRC calculation circuit 13 calculates the remainder from division of a bit sequence corresponding to the sequence of pixel data pieces by a prescribed generator polynomial. The CRC calculation circuit 13 supplies the calculated remainder as a calculated value Cr to the CRC calculation result sorting unit 14.

The CRC calculation result sorting unit 14 sorts the calculated values Cr that are the calculation results from the CRC calculation circuit 13 as calculated values Cr1 to Cr4 corresponding to the four freeze determination regions. The calculated value Cr1 is a calculation result corresponding to the first area A1, the calculated value Cr2 is a calculation result corresponding to the second area A2, the calculated value Cr3 is a calculation result corresponding to the third area A3, and the calculated value Cr4 is a calculation result corresponding to the fourth area A4, for example.

The calculation result retention unit 15 retains the calculated values Cr1 to Cr4 outputted from the CRC calculation result sorting unit 14 for one frame period, and then outputs the calculated values. The calculation result retention unit 15 is constituted of a first calculation result retention unit 15A, a second calculation result retention unit 15B, a third calculation result retention unit 15C, and a fourth calculation result retention unit 15D.

The first calculation result retention unit 15A retains the calculated value Cr1 outputted from the CRC calculation result sorting unit 14, and outputs the same as a delayed calculated value Cd1 that is delayed by one frame period. The second calculation result retention unit 15B retains the calculated value Cr2 outputted from the CRC calculation result sorting unit 14, and outputs the same as a delayed calculated value Cd2 that is delayed by one frame period. The third calculation result retention unit 15C retains the calculated value Cr3 outputted from the CRC calculation result sorting unit 14, and outputs the same as a delayed calculated value Cd3 that is delayed by one frame period. The fourth calculation result retention unit 15D retains the calculated value Cr4 outputted from the CRC calculation result sorting unit 14, and outputs the same as a delayed calculated value Cd4 that is delayed by one frame period.

The freeze determination unit 16 determines whether or not a video has frozen between frames on the basis of the calculated values Cr1 to Cr4 outputted from the CRC calculation result sorting unit 14 and the delayed calculated values Cd1 to Cd4 outputted from the calculation result retention unit 15. The freeze determination unit 16 is constituted of a first freeze determination unit 16A, a second freeze determination unit 16B, a third freeze determination unit 16C, and a fourth freeze determination unit 16D.

The first freeze determination unit 16A determines whether or not the calculated value Cr1 equals the delayed calculated value Cd1, and supplies, to the consecutive instance determination unit 17A, a freeze determination signal C1 indicating "no change" if the calculated value equals the delayed calculated value, and indicating "change has occurred" if the calculated value does not equal the delayed calculated value. Similarly, the second freeze determination unit 16B determines whether or not the calculated value Cr2 equals the delayed calculated value Cd2, and supplies a freeze determination signal C2 indicating determination results to the consecutive instance determination unit 17B. The third freeze determination unit 16C determines whether or not the calculated value Cr3 equals the delayed calculated value Cd3, and supplies a freeze determination signal C3 indicating determination results to the consecutive instance determination unit 17C. The fourth freeze determination unit 16D determines whether or not the calculated value Cr4 equals the delayed calculated value Cd4, and supplies a freeze determination signal C4 indicating determination results to the consecutive instance determination unit 17D.

The consecutive instance determination unit 17A receives supply of the freeze determination signal C1, determines whether the determination result of "no change" continues over a period of M frames (M being an integer of 1 or greater) or longer, and outputs a determination result J1 indicating the determination result. Similarly, the consecutive instance determination units 17B to 17D receive supply of the freeze determination signals C2 to C4, determine whether the determination result of "no change" continues over a period of M frames or longer, and output the respective determination results J2 to J4 indicating the determination results.

The four-area determination unit 18 determines whether or not the video is frozen on the basis of the determination results J1 to J4 supplied from the consecutive instance determination units 17A to 17D, and outputs the freeze detection signal FS indicating the determination result. The freeze detection regions (i.e., the first area A1 to fourth area A4) are assigned an order of priority in advance, for example, and the four-area determination unit 18 weights the determination results J1 to J4 according to the order of priority, thereby determining whether the video is frozen. The four-area determination unit 18 uses only a given determination result among the determination results J1 to J4 to determine whether or not the video is frozen.

As described above, in the video freeze detection circuit 21 of the present embodiment, the selection unit 12 supplies, to the CRC calculation circuit 13, a sequence of pixel data pieces for each line corresponding to the freeze determination region. As a result, the CRC calculations are sequentially executed through time division.

Figure 4:
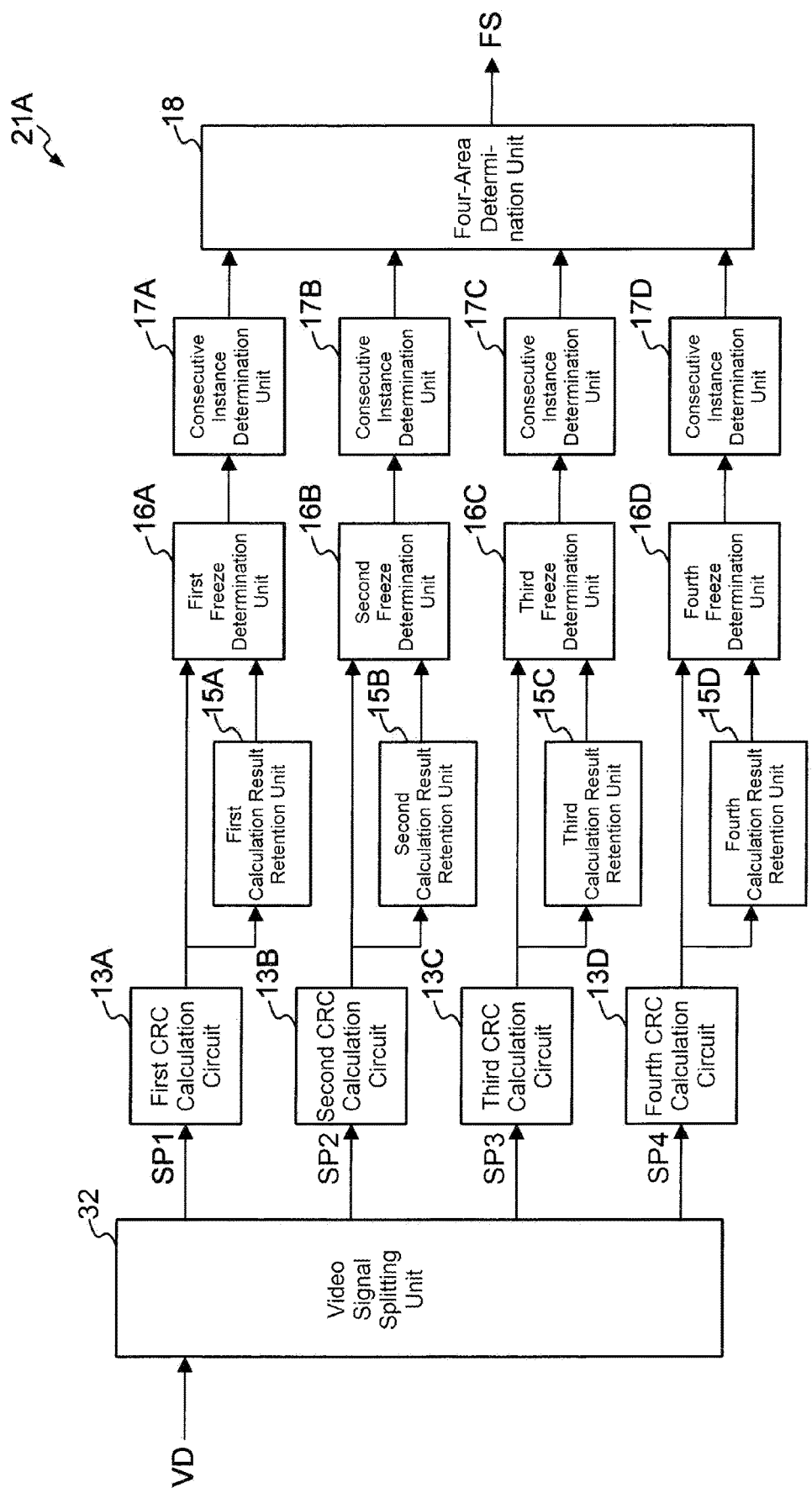
FIG. 4 is a block diagram showing an internal configuration of a video freeze detection circuit according to a comparison example.

FIG. 4 is a block diagram showing a configuration of a video freeze detection circuit 21A according to a comparison example that, unlike the video freeze detection circuit 21 of the present embodiment, is provided with a CRC calculation circuit for each of the four freeze determination regions.

In the video freeze detection circuit 21A of the comparison example, a video signal splitting unit 32 splits each frame of the captured video signal VD and generates split video signals SP1, SP2, SP3, and SP4. The split video signals SP1, SP2, SP3, and SP4 are video signals corresponding to the four freeze determination regions.

Also, in the video freeze detection circuit 21A of the comparison example, a first CRC calculation circuit 13A, a second CRC calculation circuit 13B, a third CRC calculation circuit 13C, and a fourth CRC calculation circuit 13D are provided for each of the split video signals SP1 to SP4. The first CRC calculation circuit 13A to the fourth CRC calculation circuit 13D individually perform CRC calculation and output determination results.

By contrast, the video freeze detection circuit 21 of the present embodiment is configured such that the CRC calculation circuit 13 receives the sequence of pixel data pieces from the selection unit 12 as described above, and CRC calculation is sequentially executed by time division. Thus, only one CRC calculation circuit needs to be provided, and there is no need to provide a plurality of CRC calculation circuits as done for the comparison example.

Thus, according to the video freeze detection circuit 21 of the present embodiment, it is possible to detect freezing of a video while keeping the circuit size small.

Embodiment 2

Next, Embodiment 2 of the present invention will be explained. A video signal processing device according to Embodiment 2 differs from the video signal processing device of Embodiment 1 in terms of the configuration of the video freeze detection circuit.

Figure 5:
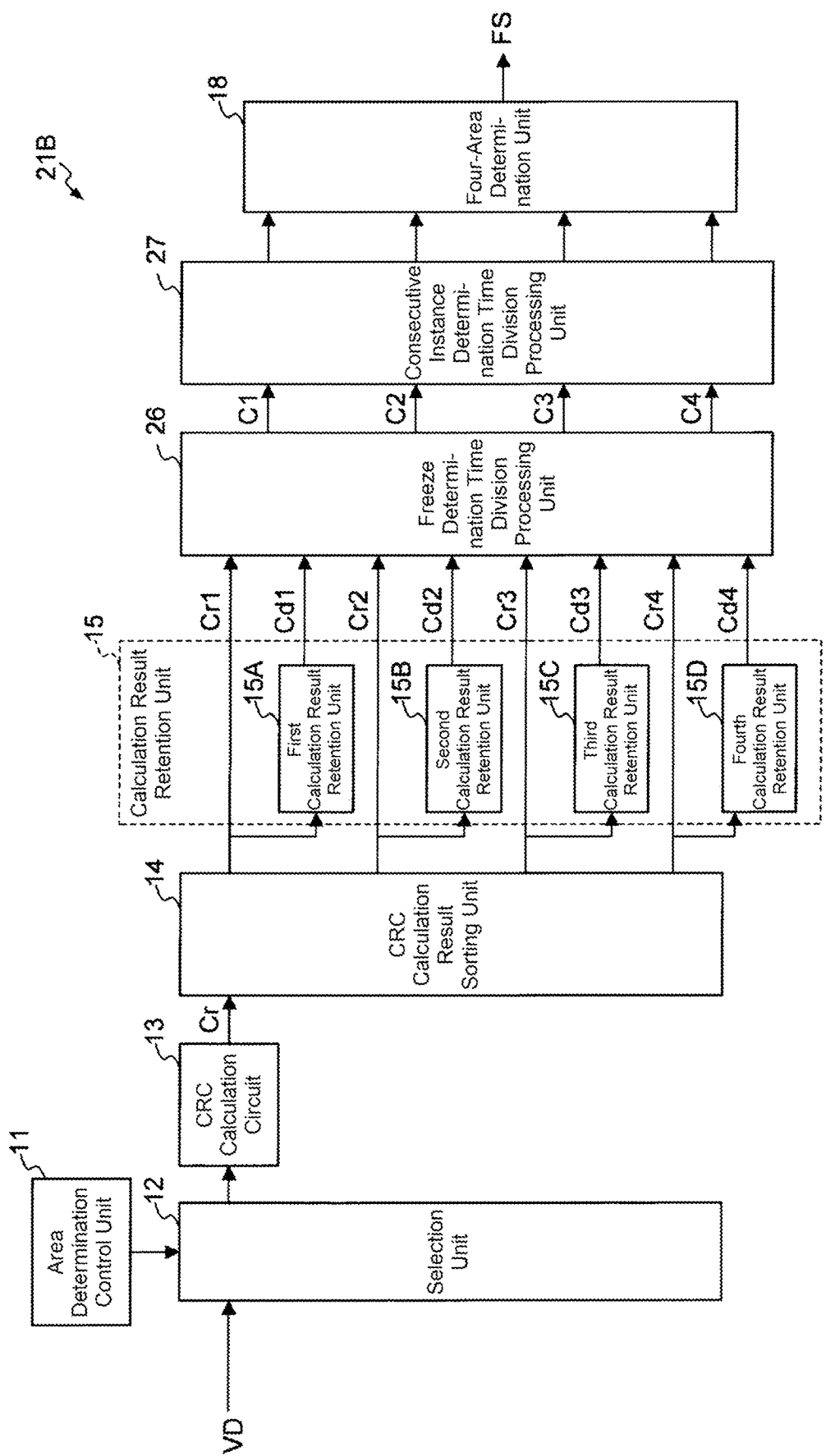
FIG. 5 is a block diagram showing an internal configuration of a video freeze detection circuit according to Embodiment 2.

FIG. 5 is a block diagram showing a configuration of a video freeze detection circuit 21B of Embodiment 2. The video freeze detection circuit 21B has a freeze determination time division processing unit 26 and a consecutive instance determination time division processing unit 27.

The freeze determination time division processing unit 26 is a processing unit that performs the freeze determination process for each split image region by time division. That is, the freeze determination time division processing unit 26 sequentially executes, by time division, freeze determination for a first freeze determination region (first area A1) on the basis of comparison between the calculated value Cr1 and the delayed calculated value Cd1, freeze determination for a second freeze determination region (second area A2) on the basis of comparison between the calculated value Cr2 and the delayed calculated value Cd2, freeze determination for a third freeze determination region (third area A3) on the basis of comparison between the calculated value Cr3 and the delayed calculated value Cd3, and freeze determination for a fourth freeze determination region (fourth area A4) on the basis of comparison between the calculated value Cr4 and the delayed calculated value Cd4. The freeze determination time division processing unit 26 has an internal counter (not shown), for example, and executes the process by time division on the basis of the count value of the internal counter.

The consecutive instance determination time division processing unit 27 is a processing unit that performs the consecutive instance determination process for each split image region by time division. That is, the consecutive instance determination time division processing unit 27 receives the freeze determination signal C1 indicating the freeze determination result for the first freeze determination region (first area A1), the freeze determination signal C2 indicating the freeze determination result for the second freeze determination region (second area A2), the freeze determination signal C3 indicating the freeze determination result for the third freeze determination region (third area A3), and the freeze determination signal C4 indicating the freeze determination result for the fourth freeze determination region (fourth area A4), and on the basis thereof, determines whether determination results indicating "no change" continue over a period of M frames (M being an integer of 1 or greater) or longer, and outputs determination results J1 to J4 indicating the determination results for each of the split image regions. The consecutive instance determination time division processing unit 27 has an internal counter (not shown), for example, and executes the process by time division on the basis of the count value of the internal counter.

The video freeze detection circuit 21B of the present embodiment is provided with one each of the freeze determination time division processing unit 26 and the consecutive instance determination time division processing unit 27, which respectively execute processes by time division. Thus, it is possible to further reduce the circuit size compared to the video freeze detection circuit 21 of Embodiment 1, in which four each of the freeze determination units and the consecutive instance determination units are provided to correspond to the four freeze determination regions.

In other words, according to the video signal processing device provided with the video freeze detection circuit 21B of the present embodiment, it is possible to detect freezing of a video while further suppressing an increase in circuit size.

The present invention is not limited to the embodiments above. In the embodiment above, for example, a case was described in which freeze determination is performed for four freeze determination regions. However, the number of split image regions subject to freeze determination is not limited thereto, and freeze determination may be performed for k (k being an integer of 2 or greater) freeze determination regions.

Also, an example is described in the embodiments in which the four-area determination unit 18 receives the determination results J1 to J4 for the first to fourth freeze determination regions and weights or selects the determination results to determine whether the video is frozen. However, a configuration may be adopted in which the area determination unit 18 does not receive all of the determination results J1 to J4, and performs selection of determination results at a prior stage. For example, a configuration may be adopted in which, if freeze determination results are necessary for only the first area A1 and the second area A2 among the first to fourth areas A1 to A4, freeze determination by the freeze determination unit 16 and consecutive instance determination by the consecutive instance determination units 17A to 17D are executed only for calculation results corresponding to the first area A1 and the second area A2.

Also, in Embodiment 2, an example was described of a case in which the freeze determination time division processing unit 26 and the consecutive instance determination time division processing unit 27 both perform processes by time division. However, a configuration may be adopted in which at least one thereof performs processes by time division and the other performs processes individually as in the configuration of Embodiment 1.

Also, in the embodiments, an example was described in which the video freeze determination results are used in a driving aid system that aids the driving of a vehicle. However, the video signal processing device of the present invention is not limited to being installed in a driving aid system, and can be used in all systems where detection of video freeze is necessary.

What is claimed is:

1. A video signal processing device, comprising:
    a selection/output unit that receives a video signal including a sequence of a plurality of pixel data pieces over a plurality of frames, and that sequentially selects and outputs sequences of image data pieces of first to kth split image regions (k being an integer of 2 or greater) that are respectively at same positions over the plurality of frames;
    a CRC calculation circuit that executes a cyclic redundancy check (CRC) calculation on the sequence of the plurality of pixel data pieces received by the selection/output unit;
    a calculation result sorting unit that generates first to kth test values corresponding, respectively, to the first to kth split image regions based on a calculation result of the CRC calculation circuit;
    a freeze determination unit that, based on the first to kth test values corresponding to one frame of the video signal and the first to kth test values corresponding to another frame, determines whether a change has occurred in video of the first to kth split image regions between the plurality of frames, and generates first to kth freeze determination signals representing respective determination results; and
    a video freeze detection unit that, by determining whether or not a state in which no change has occurred in the video is continuing over a prescribed number of frame periods based on the first to kth freeze determination signals, detects whether or not video based on the video signal is frozen.

2. The video signal processing device according to claim 1,
    wherein the video freeze detection unit includes first to kth consecutive instance determination units that each execute a consecutive instance determination process of determining whether the state in which no change has occurred in the video is continuing over the prescribed number of frame periods for each of the first to kth split image regions, and wherein whether the video based on the video signal is frozen is detected based on a process result of the consecutive instance determination process for at least one of the first to kth split image regions.

3. The video signal processing device according to claim 1, wherein the freeze determination unit includes first to kth freeze determination circuits that each determine whether or not a change has occurred between frames in the video of the first to kth split image regions.

4. The video signal processing device according to claim 1, wherein the freeze determination unit sequentially determines, by time division, whether a change has occurred in video between frames for each of the first to kth split video regions based on the first to kth test values.

5. The video signal processing device according to claim 1, wherein the video freeze detection unit sequentially determines whether the state in which no change has occurred in the video is continuing over the prescribed number of frame periods for each of the first to kth split image regions.

6. The video signal processing device according to claim 5, wherein the video signal is constituted of a plurality of lines each made up of a sequence of pixel data pieces for each frame, and wherein the selection/output unit sequentially selects and then outputs a sequence of image data pieces of the first to kth split image regions for each of sequences of the pixel data pieces corresponding to one line of the video signal.

* * * * *